United States Patent
Matsushima et al.

(10) Patent No.: US 9,890,044 B2
(45) Date of Patent: Feb. 13, 2018

(54) METHOD FOR RECOVERING AND PURIFYING ARGON GAS FROM SILICON SINGLE CRYSTAL MANUFACTURING APPARATUS AND APPARATUS FOR RECOVERING AND PURIFYING ARGON GAS

(71) Applicant: SHIN-ETSU HANDOTAI CO., LTD., Tokyo (JP)

(72) Inventors: Hideaki Matsushima, Nasushiobara (JP); Ichiro Onozawa, Annaka (JP); Wataru Yajima, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 0 days.

(21) Appl. No.: 15/109,380

(22) PCT Filed: Jan. 14, 2015

(86) PCT No.: PCT/JP2015/000128
§ 371 (c)(1),
(2) Date: Jun. 30, 2016

(87) PCT Pub. No.: WO2015/115031
PCT Pub. Date: Aug. 6, 2015

(65) Prior Publication Data
US 2016/0325996 A1    Nov. 10, 2016

(30) Foreign Application Priority Data
Jan. 29, 2014   (JP) ................................. 2014-014391

(51) Int. Cl.
*C01B 23/00* (2006.01)
*B01D 53/26* (2006.01)
(Continued)

(52) U.S. Cl.
CPC ...... *C01B 23/0094* (2013.01); *B01D 53/0462* (2013.01); *B01D 53/261* (2013.01);
(Continued)

(58) Field of Classification Search
None
See application file for complete search history.

(56) References Cited

U.S. PATENT DOCUMENTS 6,074,621 A    6/2000 Hsiung et al.
6,123,909 A *  9/2000 Yamamoto .......... C01B 23/0094
                                        202/152
(Continued)

FOREIGN PATENT DOCUMENTS

CN    1091331 A    8/1994
CN    1237124 A   12/1999
(Continued)

OTHER PUBLICATIONS

Mar. 24, 2015 International Search Report issued in International Application No. PCT/JP2015/000128.
(Continued)

*Primary Examiner* — Sheng H Davis
(74) *Attorney, Agent, or Firm* — Oliff PLC (57) ABSTRACT

An argon gas recovering and purifying method including: introducing waste argon gas containing nitrogen, oxygen, and carbon monoxide from silicon single crystal manufacturing apparatus into waste argon gas storage tank; removing solid matters in pretreatment facility which removes the solid matters in waste argon gas; converting oxygen into water and converting carbon monoxide into carbon dioxide by catalytic reaction; removing the water, the carbon dioxide, and the nitrogen to obtain recovered gas, in the argon gas recovering and purifying method and an argon gas recovering and purifying apparatus, the catalytic reaction is
(Continued)

carried out with compression heat alone by arranging a catalyst in a two-stage compressor, and the water is removed by a dryer in advance and then the nitrogen and the carbon dioxide are adsorbed and removed in an ordinary-temperature adsorption tower at the step of obtaining the recovered gas.

23 Claims, 1 Drawing Sheet

(51) Int. Cl.
    *B01D 53/62*     (2006.01)
    *B01D 53/75*     (2006.01)
    *B01D 53/86*     (2006.01)
    *B01D 53/04*     (2006.01)
    *B01D 53/047*     (2006.01)

(52) U.S. Cl.
    CPC ............ *B01D 53/62* (2013.01); *B01D 53/75* (2013.01); *B01D 53/864* (2013.01); *B01D 53/8671* (2013.01); *C01B 23/001* (2013.01); *C01B 23/0015* (2013.01); *C01B 23/0021* (2013.01); *C01B 23/0057* (2013.01); *C01B 23/0068* (2013.01); *C01B 23/0078* (2013.01); *B01D 53/047* (2013.01); *B01D 2253/104* (2013.01); *B01D 2253/106* (2013.01); *B01D 2253/108* (2013.01); *B01D 2255/1021* (2013.01); *B01D 2256/18* (2013.01); *B01D 2257/102* (2013.01); *B01D 2257/104* (2013.01); *B01D 2257/502* (2013.01); *B01D 2257/504* (2013.01); *B01D 2257/80* (2013.01); *B01D 2258/0216* (2013.01); *C01B 2210/005* (2013.01); *C01B 2210/0034* (2013.01); *C01B 2210/0045* (2013.01); *C01B 2210/0046* (2013.01); *C01B 2210/0098* (2013.01); *Y02C 10/04* (2013.01); *Y02C 10/08* (2013.01); *Y02P 20/152* (2015.11)

(56) References Cited

U.S. PATENT DOCUMENTS

| | | | | |
|---|---|---|---|---|
| 2009/0193967 | A1* | 8/2009 | Whitley | ............... B01D 53/047 |
| | | | | 95/98 |
| 2012/0085125 | A1* | 4/2012 | Wanner | ............... C01B 23/0094 |
| | | | | 62/617 |
| 2013/0149226 | A1* | 6/2013 | Song | ......................... F25J 3/08 |
| | | | | 423/262 |

FOREIGN PATENT DOCUMENTS

| | | | |
|---|---|---|---|
| CN | 102206521 | * | 10/2011 |
| CN | 202304444 | * | 7/2012 |
| CN | 102718199 | A | 10/2012 |
| CN | 103224225 | A1 | 7/2013 |
| CN | 103373716 | A | 10/2013 |
| EP | 0606081 | A1 | 7/1994 |
| JP | H06-234511 | A | 8/1994 |
| JP | H11-83309 | A | 3/1999 |
| JP | 2000-088455 | A | 3/2000 |
| JP | 3496079 | B2 | 2/2004 |
| JP | 2006-111506 | A | 4/2006 |
| JP | 4024347 | B2 | 12/2007 |
| JP | 2011208712 | * | 3/2010 |
| JP | 4733960 | B2 | 7/2011 |

OTHER PUBLICATIONS

Mar. 10, 2017 Office Action issued in Chinese Patent Application No. 201580006723.5.
Oct. 16, 2017 Office Action issued in Chinese Patent Application No. 201580006723.5.

* cited by examiner

METHOD FOR RECOVERING AND PURIFYING ARGON GAS FROM SILICON SINGLE CRYSTAL MANUFACTURING APPARATUS AND APPARATUS FOR RECOVERING AND PURIFYING ARGON GAS

TECHNICAL FIELD

The present invention relates to a method for recovering and purifying an argon gas from a silicon single crystal manufacturing apparatus and an apparatus for recovering and purifying an argon gas from the same.

BACKGROUND ART

In a silicon single crystal manufacturing apparatus that is used for manufacture of a silicon single crystal based on the Czochralski (CZ) method, a seed crystal is brought into contact with a highly heated silicon melt in a crucible in an argon atmosphere and pulled up while being rotated, thereby growing a single crystal. It is crucial for recovery, purification, and recycle of the argon gas to discharge the argon gas by a vacuum pump in this silicon single crystal manufacturing apparatus, and then remove an impurity gas through a preprocess of removing silicon oxides contained in this waste gas.

As disclosed in Patent Literature 1, there have been suggested a step of removing solid contents in a waste gas, a step of compressing the waste gas, a step of removing oil contents, a catalytic reaction step of adding hydrogen exceeding a stoichiometric amount required for oxygen in the waste gas to convert the oxygen into water by a catalytic reaction, an adsorption step of adsorbing and removing the water and carbon dioxide produced by the catalytic reaction with the use of an adsorption cylinder at ordinary temperatures, and a method for purifying the waste gas which has been through each step.

Further, in Patent Literature 2, the following method is suggested. That is, a waste gas is taken into a gas holder by a blower and then passes through a heat exchanger for preheating and a heater via a dust collector which removes solid contents, a compressor which compresses the waste gas, an oil removal cylinder, and an oil filter, oxygen in the waste gas and hydrogen previously added to the waste gas are converted into water by a catalytic reaction with the use of a catalytic cylinder, and the water and carbon dioxide are adsorbed and removed by an adsorption cylinder via a cooling device. The waste gas is further introduced into a cold box, cooled by a main heat exchanger, and then subjected to gas-liquid contact in a rectifying cylinder, and an impurity gas having a lower boiling point than argon is separated and removed by liquefaction and rectification, thereby improving purity of a waste argon gas.

On the other hand, Patent Literature 3 suggests a method having a step of heating a waste gas, adding air or oxygen, converting carbon monoxide and hydrogen into carbon dioxide and water with the use of a catalytic cylinder, then cooling them, adsorbing and removing the carbon dioxide and the water in an adsorption cylinder of ordinary temperatures, further cooing the waste gas to −10 to −50°, and adsorbing the remaining carbon monoxide and nitrogen after a step of removing solid contents in the waste gas, a step of compressing the waste gas, and a step of removing oil contents.

Figure 3:
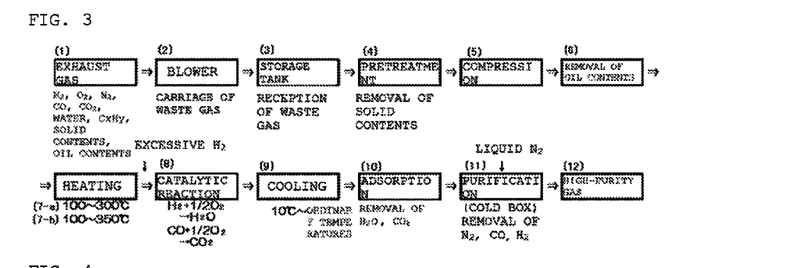
FIG. 3 is a flowchart showing an argon gas recovering and purifying method according to Patent Literature 1 and Patent Literature 2.

FIG. 3 is a flowchart showing a method for recovering and purifying an argon gas according to each of Patent Literature 1 and Patent Literature 2. As shown in FIG. 3, in Patent Literature 1, a waste gas (FIG. 3(1)) from a single crystal manufacturing furnace is first compressed (FIG. 3(2)) by a blower and put into a gas holder (FIG. 3(3)), then solid dust is removed (FIG. 3(4)) by a dust collector and compressed (FIGS. 3(5)) to 730 kPa, and oil contents are removed (FIG. 3(6)). Thereafter, the waste gas is heated to 100 to 300° C. by a heater (FIG. 3(7-a)), hydrogen exceeding a stoichiometric amount required for oxygen in the waste gas is added, oxygen is converted into water and carbon monoxide is converted into carbon dioxide in a catalytic cylinder respectively (FIG. 3(8)), they are passed through a heat recovery heat exchanger and cooled to 10° C. by a cooling device (FIG. 3(9)), and then water and the carbon dioxide are adsorbed by an adsorption tower (FIG. 3(10)). Subsequently, the waste gas is introduced into a cold box, and nitrogen, the carbon monoxide, and the hydrogen are rectified and removed (FIG. 3(11)), and high-purity argon is thereby provided (FIG. 3(12)).

As shown in FIG. 3, in Patent Literature 2, substantially the same steps as Patent literature 1 are carried out until the removal of oil contents in the waste gas, then heating to 100 to 350° C. is performed by the heater (FIG. 3(7-b)), the hydrogen exceeding the stoichiometric amount required for the oxygen in the waste gas is added, and conversion to water is thereby performed in the catalytic cylinder. Subsequently, the waste gas is allowed to pass through the cooling device, the water and the carbon dioxide are adsorbed and removed at ordinary temperatures, then the waste gas is introduced into the cold box like Patent Literature 1, and the nitrogen, the carbon monoxide, and others which are yet to react are removed, thereby providing the high-purity argon.

Figure 4:
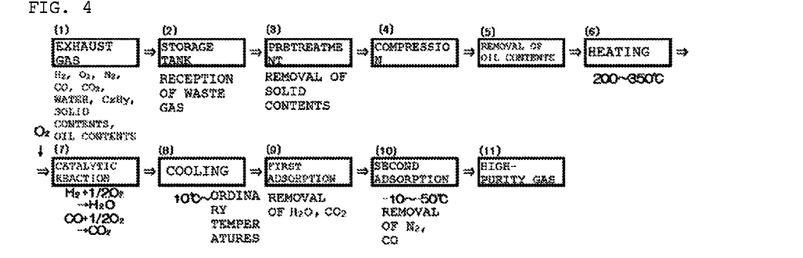
FIG. 4 is a flowchart showing an argon gas recovering and purifying method according to Patent Literature 3.

FIG. 4 is a flowchart showing a method for recovering and purifying an argon gas according to Patent Literature 3. As shown in FIG. 4, in Patent Literature 3, the same steps as Patent Literature 1 and Patent Literature 2 are carried out until the removal of oil contents in the waste gas (FIGS. 4(1) to (5)), then heating to 200 to 350° C. is performed by the heater (FIG. 4(6)), a slightly smaller amount of oxygen than a stoichiometric amount required for the hydrogen and the carbon monoxide in the waste gas is added, and the waste gas is converted into the water or the carbon dioxide by a reaction in the catalytic cylinder (FIG. 4(7)). Thereafter, the waste gas is cooled to ordinary temperatures by the cooling device (FIG. 4(8)) and then introduced into a first adsorption cylinder, and the water and the carbon dioxide are adsorbed and removed with the use of zeolite (FIG. 4(9)). Furthermore, in the second adsorption cylinder, the nitrogen and the carbon monoxide which is yet to react is removed from the waste gas maintained at lower temperatures (−10 to −50° C.) by using the zeolite in an adsorption tower (FIG. 4(10)), thereby providing the high-purity argon (FIG. 4(11)).

CITATION LIST

Patent Literatures

Patent Literature 1: Japanese Unexamined Patent Application Publication No. 2000-88455
Patent Literature 2: Japanese Patent No. 4024347
Patent Literature 3: Japanese Patent No. 3496079

SUMMARY OF INVENTION

Technical Problem

At the time of recovering and purifying a waste argon gas discharged from a silicon single crystal manufacturing apparatus, impurity gases (nitrogen, oxygen, carbon monoxide, and the like) contained in this waste gas must be removed as must as possible, the major premise is to prevent atmospheric components from being mixed from the outside as much as possible until the waste gas is recovered and purified. Moreover, it is necessary to facilitate removal of the oxygen or the carbon monoxide in the waste gas by a subsequent adsorption method or a rectification method by converting it into water or carbon dioxide by using a catalytic reaction in advance. Thus, the waste gas must be heated to temperatures required for the catalytic reaction, a reactant gas (hydrogen or oxygen) required for the catalytic reaction must be added, and the waste gas must be cooled after the reaction to brace for a subsequent step (an adsorption step). Additionally, moisture produced by the catalytic reaction is adsorbed well by zeolite used as an adsorbent, but its adsorbability is gradually lowered by the adsorbed moisture depending on a type of the zeolite. On the other hand, in case of removing nitrogen or oxygen contained in the argon gas, it is known that rectification is performed to improve purity of the argon gas. Further, at low temperatures, the nitrogen and the like in the argon are adsorbed and removed by the zeolite. However, in these cases, facilities are complicated, and a facility for the rectification is a high-pressure gas manufacturing facility, and handling of this facility is different from that of general facilities, a high burden is imposed in terms of costs and operations, and processing a large air volume of the waste gas is not easy.

In view of the problems, it is an object of the present invention to provide an argon gas recovering and purifying method and an argon gas recovering and purifying apparatus which can stably remove an impurity gas contained in a large air volume of argon gas discharged from a silicon single crystal manufacturing apparatus with the use of a simple low-cost facility.

Solution to Problem

To achieve the object, according to the present invention, there is provided an argon gas recovering and purifying method including steps of: introducing a waste argon gas containing nitrogen, oxygen, and carbon monoxide from a silicon single crystal manufacturing apparatus into a waste argon gas storage tank; removing solid matters in a pretreatment facility which removes the solid matters in the waste argon gas; converting the oxygen into water and converting the carbon monoxide into carbon dioxide by a catalytic reaction; and removing the water, the carbon dioxide, and the nitrogen to obtain a recovered gas, wherein the catalytic reaction is carried out with compression heat alone by arranging a catalyst in a two-stage compressor, and the water is removed by a dryer in advance and then the nitrogen and the carbon dioxide are adsorbed and removed in an ordinary-temperature adsorption tower at the step of obtaining the recovered gas.

According to the argon gas recovering and purifying method, it is possible to stably remove the impurity gas contained in a large air volume of the argon gas discharged from the silicon single crystal manufacturing apparatus with the use of a simple low-cost facility.

Further, it is preferable to directly connect the silicon single crystal manufacturing apparatus to the waste argon gas storage tank through a waste argon gas pipe without installing a fluid carrying device so that a positive pressure is constantly maintained without providing a position with a negative pressure in the waste argon gas pipe.

According to the argon gas recovering and purifying method, it is possible to assuredly suppress infiltration of air due to leak from one or more silicon single crystal manufacturing apparatuses connected to the pipes or connecting pipes for them.

Furthermore, it is preferable that, at the step of converting, oxygen is added to the waste argon gas while controlling an additive amount before a first-stage compression unit in the two-stage compressor, then one-stage compressing operation is performed, a temperature of the waste argon gas is increased to 100 to 200° C. by compression heat generated by the compressing operation, and then the carbon monoxide and the added oxygen are immediately subjected to the catalytic reaction in a first-stage catalytic unit installed behind the first-stage compression unit to convert them into the carbon dioxide, and hydrogen is then added to the waste argon gas while controlling an additive amount before a second-stage compression unit in the two-stage compressor to perform second-stage compressing operation, a temperature of the waste argon gas is increased to 100 to 200° C. by compression heat generated by the compressing operation, and then the oxygen and the added hydrogen are immediately subjected to the catalytic reaction in a second-stage catalytic unit installed behind the second-stage compression unit to convert them into the water.

According to the argon gas recovering and purifying method, the impurity gas in the waste gas can be further efficiently removed.

In this case, it is preferable not to use a heat source in any unit other than the first-stage compression unit and the second-stage compression unit.

According to the argon gas recovering and purifying method, the catalytic reaction can be realized with minimum energy.

In this case, it is preferable to install an intercooler immediately after the first-stage catalytic unit and install an aftercooler immediately after the second-stage catalytic unit to cool the waste argon gas without providing a cooling device outside the two-stage compressor.

According to the argon gas recovering and purifying method, a freezer device is not required outside the two-stage compressor, and the catalytic reaction can be realized with the minimum energy.

Moreover, it is preferable that, at the time of introducing the waste argon gas into the two-stage compressor, a fixed amount of the waste argon gas is allowed to constantly flow through the two-stage compressor by constantly monitoring an intake pressure or a discharge pressure to a fluctuation in a flow volume of the waste argon gas at an inlet of the two-stage compressor to perform bypass control.

According to the argon gas recovering and purifying method, reactions in the respective catalytic units can be stabilized.

Additionally, it is preferable for the dryer to be a non-purge type dryer having a silica alumina base, activated alumina base, or synthetic zeolite base adsorbent.

When the dehumidification is performed with such a dryer, the moisture can be stably removed while reducing loss of the waste gas as much as possible, and capacity degradation of the adsorbent (the zeolite) due to the moisture in the step of adsorbing the nitrogen or the carbon dioxide can be avoided.

Further, it is preferable for the ordinary-temperature adsorption tower to be a multi-tower type ordinary-temperature adsorption tower.

When the adsorption tower is used, the adsorption and the removal can be more efficiently carried out.

In this case, it is preferable to use a three-tower type ordinary-temperature adsorption tower as the multi-tower type ordinary-temperature adsorption, and to alternately switch and repeat adsorption and removal of the nitrogen and the carbon dioxide in the waste argon gas, desorption of the adsorbed nitrogen and carbon dioxide, and pressure raising in the adsorption tower.

According to the argon gas recovering and purifying method using such an adsorption tower, when the adsorption, the desorption, and the pressurization are alternately switched and repeated in each tower, the nitrogen and the carbon dioxide in the waste gas can be continuously adsorbed and removed.

Furthermore, it is preferable that, at the time of performing the pressure raising in any adsorption tower in the three-tower type ordinary-temperature adsorption tower, an amount of the recovered gas used for the pressure raising is controlled in accordance with an inflow amount of the waste argon gas which flows into the adsorption tower by measuring the inflow amount.

According to the argon gas recovering and purifying method, a pressure fluctuation in the adsorption tower can be absorbed, and the adsorption can be stably carried out.

Moreover, it is preferable to automatically change times of the adsorption, the desorption, and the pressure raising in accordance with a fluctuation in a flow volume of the waste argon gas.

When the adsorption tower is used, the adsorption, the desorption, and the pressurization can be more efficiently alternately switched and repeated.

Additionally, it is preferable that, when a level of the waste argon gas storage tank is lowered with a fluctuation in flow volume of the waste argon gas, a full amount of the recovered gas is automatically returned to the waste argon gas storage tank.

According to the argon gas recovering and purifying method, the operation can be continuously performed without deactivating the facility.

Additionally, it is preferable that, when concentrations of the nitrogen, the oxygen, and the carbon monoxide in the recovered gas exceed predetermined allowable values, supply of the recovered gas to the silicon single crystal manufacturing apparatus is immediately stopped, and a part or all of the recovered gas is purged outdoors or returned to the waste argon gas storage tank.

According to the argon gas recovering and purifying method, the impurity gas can be prevented from flowing toward the silicon single crystal manufacturing apparatus side.

Further, it is preferable that, when concentrations of the nitrogen, the oxygen, or the carbon monoxide in the waste argon gas exceed predetermined allowable values at an inlet of the ordinary-temperature adsorption tower, supply of the waste argon gas to the ordinary-temperature adsorption tower is immediately stopped, and a part or all of the waste argon gas is purged outdoors or returned to the waste argon gas storage tank.

According to the argon gas recovering and purifying method, the impurity gas can be prevented from flowing toward the downstream side.

Furthermore, according to the present invention, there is provided an argon gas recovering and purifying apparatus including:

a waste argon gas storage tank which receives a waste argon gas containing nitrogen, oxygen, and carbon monoxide from a silicon single crystal manufacturing apparatus;

a pretreatment facility which removes solid matters in the waste argon gas;

a two-stage compressor which has a catalyst arranged therein, the catalyst enabling a catalytic reaction of converting the oxygen into water and converting the carbon monoxide into carbon dioxide with the use of only compression heat generated by compressing the waste argon gas;

a dryer comprising an adsorbent which enables removal of the water; and an ordinary-temperature adsorption tower including an adsorbent which enables removal of the carbon dioxide and the nitrogen.

The argon gas recovering and purifying apparatus is a simple low-cost apparatus, and can stably remove the impurity gas contained in the large air volume of the argon gas discharged from the silicon single crystal manufacturing apparatus.

Moreover, it is preferable to directly connect the waste argon gas storage tank to a silicon single crystal manufacturing apparatus through a waste argon gas pipe without installing a fluid carrying device.

According to the argon gas recovering and purifying apparatus, it is possible to assuredly suppress infiltration of air due to leak from one or more silicon single crystal manufacturing apparatuses connected to the pipes or connecting pipes for them.

Additionally, it is preferable for the two-stage compressor to include: an oxygen flow volume adjuster which adds oxygen to the waste argon gas while controlling an additive amount; a first-stage compression unit which performs first compression; a first-stage catalytic unit which has a catalyst arranged therein and performs a catalytic reaction of converting the carbon monoxide into carbon dioxide with the use of only compression heat generated by the first compression; a hydrogen flow volume adjuster which adds hydrogen to the waste argon gas while controlling an additive amount; a second-stage compression unit which performs second compression; and a second-stage catalytic unit which has a catalyst arranged therein and performs a catalytic reaction of converting the oxygen into water by using only compression heat generated by the second compression.

According to the argon gas recovering and purifying apparatus, the impurity gas in the waste gas can be further efficiently removed.

In this case, it is preferable not to include a heat source in any unit other than the first-stage compression unit and the second-stage compression unit.

According to the argon gas recovering and purifying apparatus, the catalytic reaction can be realized with minimum energy.

Further, it is preferable to install an intercooler immediately after the first-stage catalytic unit, to install an aftercooler immediately after the second-stage catalytic unit, and not to install a cooling device outside the two-stage compressor.

According to the argon gas recovering and purifying apparatus, a freezer device is not required outside the two-stage compressor, and the catalytic reaction can be realized with the minimum energy.

Furthermore, it is preferable for the argon gas recovering and purifying apparatus to further include an automatic pressure adjuster which constantly monitors an intake pressure or a discharge pressure to a fluctuation in a flow volume of the waste argon gas at an inlet of the two-stage compressor to perform bypass control.

According to the argon gas recovering and purifying apparatus, when catalytic reactions are carried out in the respective catalytic units, the reactions can be stabilized.

Moreover, it is preferable for the dryer to be a non-purge type dryer having a silica alumina base, activated alumina base, or synthetic zeolite base adsorbent.

According to the dryer, the moisture can be stably removed while reducing loss of the waste gas as much as possible, and adsorption of the moisture to the adsorbent (the zeolite or the like) can be avoided at the time of adsorbing and removing the nitrogen or the carbon dioxide in the adsorption tower.

Additionally, it is preferable for the ordinary-temperature adsorption tower to be a three-tower type ordinary-temperature adsorption tower.

According to the adsorption tower, the adsorption and the removal can be more efficiently carried out.

Further, it is preferable for the argon gas recovering and purifying apparatus to further include a recovered gas analyzer which measures concentrations of the nitrogen, the oxygen, and the carbon monoxide in the recovered gas.

When the apparatus is further provided, a change in concentration of the impurity gas can be constantly measured.

Furthermore, it is preferable for the argon gas recovering and purifying apparatus to further include a recovered gas returning pipe which returns a part or all of the recovered gas to the waste argon gas storage tank when a level of the waste argon gas storage tank is lowered or a measurement value of the recovered gas analyzer exceeds an allowable value.

When the apparatus is further provided, the impurity gas can be prevented from flowing toward the silicon single crystal manufacturing apparatus side.

Moreover, it is preferable for the argon gas recovering and purifying apparatus to further include a purge valve which purges a part or all of the recovered gas or the waste argon gas outdoors when concentrations of the nitrogen, the oxygen, and the carbon monoxide in the waste argon gas exceed predetermined allowable values at an inlet of the ordinary-temperature adsorption tower or a measurement value of the recovered gas analyzer exceeds an allowable value.

When the apparatus is further provided, the impurity gas can be prevented from flowing toward the downstream side.

Advantageous Effects of Invention

According to the present invention, the impurity gas in the waste argon gas (the waste gas) discharged from the silicon single crystal manufacturing apparatus can be removed with the minimum energy. Additionally, the moisture which is readily adsorbed to the zeolite and, on the other hand, hard to regenerate when it is adsorbed is previously removed in a dryer, e.g., a non-purge type dryer having a silica alumina base, activated alumina base, or synthetic zeolite base adsorbent, and then residual nitrogen or carbon dioxide is removed by the adsorbent (e.g., the zeolite in a multi-tower type ordinary-temperature adsorption tower) in the ordinary-temperature adsorption tower, thereby prolonging a life of the adsorbent (the zeolite). Further, according to the present invention, since the facility is not complicated and a high-pressure gas manufacturing facility is not used, handling is easy, construction costs and operation costs can be reduced, and a large air volume of the waste gas can be stably processed.

DESCRIPTION OF EMBODIMENTS

The present invention will now be described in more detail hereinafter.

As described above, there has been demanded an argon gas recovering and purifying method which can stably remove an impurity gas contained in a large air volume of argon gas discharged from a silicon single crystal manufacturing apparatus by using a simple low-cost facility.

As a result of conducting keen examination to achieve the object, the present inventors have discovered that the above-mentioned problems can be solved by an argon gas recovering and purifying method including steps of: introducing a waste argon gas containing nitrogen, oxygen, and carbon monoxide from a silicon single crystal manufacturing apparatus into a waste argon gas storage tank; removing solid matters in a pretreatment facility which removes the solid matters in the waste argon gas; converting the oxygen into water and converting the carbon monoxide into carbon dioxide by a catalytic reaction; and removing the water, the carbon dioxide, and the nitrogen to obtain a recovered gas, wherein the catalytic reaction is carried out with compression heat alone by arranging a catalyst in a two-stage compressor, and the water is removed by a dryer in advance and then the nitrogen and the carbon dioxide are adsorbed and removed in an ordinary-temperature adsorption tower at the step of obtaining the recovered gas, thereby bringing the argon gas recovering and purifying method according to the present invention to completion.

Furthermore, as described above, there has been demanded an argon gas recovering and purifying apparatus which is a simple and low-cost apparatus and can stably remove an impurity gas contained in a large air volume of argon gas discharged from a silicon single crystal manufacturing apparatus.

As a result of conducting keen examination to achieve the object, the present inventors have discovered that the above-mentioned problems can be solved by an argon gas recovering and purifying apparatus including:

a waste argon gas storage tank which receives a waste argon gas containing nitrogen, oxygen, and carbon monoxide from a silicon single crystal manufacturing apparatus;

a pretreatment facility which removes solid matters in the waste argon gas;

a two-stage compressor which has a catalyst arranged therein, the catalyst enabling a catalytic reaction of converting the oxygen into water and converting the carbon monoxide into carbon dioxide with the use of only compression heat generated by compressing the waste argon gas;

a dryer including an adsorbent which enables removal of the water; and an ordinary-temperature adsorption tower including an adsorbent which enables removal of the carbon dioxide and the nitrogen, thereby bringing the argon gas recovering and purifying apparatus according to the present invention to completion.

An embodiment according to the present invention will now be specifically described hereinafter with reference to the drawings, but the present invention is not restricted thereto.

[Argon Gas Recovering and Purifying Apparatus]

An argon gas recovering and purifying apparatus according to the present invention will now be described hereinafter with reference to FIG. 2, but the present invention is not restricted thereto.

Figure 2:
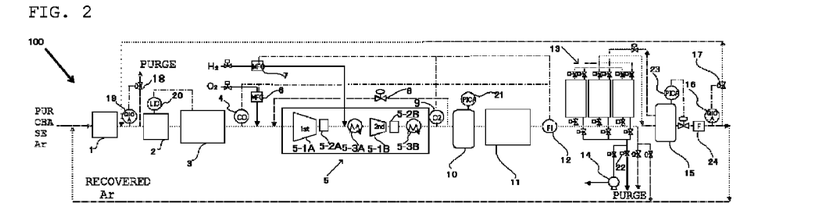
FIG. 2 is a schematic view showing an example of an argon gas recovering and purifying apparatus according to the present invention.

FIG. 2 is a schematic view showing an example of an argon gas recovering and purifying apparatus according to the present invention. As shown in FIG. 2, an argon gas recovering and purifying apparatus 100 has a waste argon gas storage tank 2 which receives a waste argon gas containing nitrogen, oxygen, and carbon monoxide from a silicon single crystal manufacturing apparatus 1, a pretreatment facility 3 which removes solid contents in the waste argon gas, a two-stage compressor 5 which can perform a catalytic reaction of converting the oxygen into water and converting the carbon monoxide into carbon dioxide respectively by using only compression heat generated by compressing the waste argon gas and which has a catalyst arranged therein, a dryer 11 including an adsorbent which can remove the water, and an ordinary-temperature adsorption tower 13 including an adsorbent which can remove the carbon dioxide and the nitrogen.

Since such an argon gas recovering and purifying apparatus performs the catalytic reaction by using only the compression heat of the two-stage compressor, an impurity gas in the waste argon gas can be removed with minimum energy. Further, moisture which is readily adsorbed to the adsorbent such as zeolite and is hard to regenerate after being adsorbed is removed by the dryer in advance, and then the residual nitrogen or carbon dioxide is removed by the adsorbent (the zeolite or the like) in the ordinary-temperature adsorption tower, thereby prolonging a lifespan of the adsorbent (the zeolite).

In the waste argon gas storage tank 2, an air volume can be automatically controlled by using an LIC (a level indication controller) 20 in accordance with a fluctuation in receiving amount of the waste argon gas from the silicon single crystal manufacturing apparatus 1.

The pretreatment facility 3 preferably has, e.g., means for dissolving and removing a solid matter (a silicon oxide) in the waste argon gas discharged from the silicon single crystal manufacturing apparatus 1 by bringing the solid matter into contact with a strong alkaline solution, and means for removing mist containing an alkaline component in the waste argon gas after removal of the silicon oxide by using a demister.

As the catalyst arranged in the two-stage compressor 5, there is, e.g., Pt (platinum).

The argon gas recovering and purifying apparatus according to the present invention can further include the following facilities and others as required.

Although the waste argon gas storage tank 2 is connected to the silicon single crystal manufacturing apparatus 1 through a waste argon gas pipe, at this time, it is preferable to directly connect the waste argon gas storage tank 2 to the silicon single crystal manufacturing apparatus 1 through the waste argon gas pipe without installing a fluid carrying device therebetween. According to such an argon gas recovering and purifying apparatus, it is possible to suppress infiltration of air due to leak from one or more silicon single crystal manufacturing apparatuses connected to pipes or their connection pipes.

An air component monitoring meter (QICA) 19 may be provided on a preceding side of the waste argon gas storage tank 2. When the air component monitoring meter is provided, air component concentration in the waste gas can be constantly monitored. When the air component concentration exceeds a fixed numerical value, the waste gas can be immediately discharged to the outside of the system by opening a waste argon gas purge valve 18.

Furthermore, the two-stage compressor 5 preferably has an oxygen flow volume adjuster ($O_2$MFC (a mass flow controller)) 6 that adds oxygen to the waste argon gas while controlling an additive amount, a first-stage compression unit 5-1A that performs first compression, a first-stage catalytic unit 5-2A that has a catalyst arranged therein and performs a catalytic reaction of converting the carbon monoxide into the carbon dioxide by using only compression heat generated by the first compression, a hydrogen flow volume adjuster ($H_2$MFC) 7 that adds hydrogen to the waste argon gas while controlling an additive amount, a second-stage compression unit 5-1B that performs second compression, and a second-stage catalytic unit 5-2B that has a catalyst arranged therein and performs a catalytic reaction of converting oxygen into water by using only compression heat generated by the second compression. Such an argon gas recovering and purifying apparatus can further efficiently remove the impurity gas in the waste gas.

At the time of introducing the waste gas into the two-stage compressor 5, it is preferable to measure carbon monoxide concentration in the waste gas by using a CO densitometer 4 in advance. An amount of the carbon monoxide in the waste gas is calculated from this measurement value and a measurement value of a waste gas flowmeter 12 at an outlet of the dryer 11, an amount of oxygen that is required for or excessive to complete combustion of the carbon monoxide in a catalytic reaction is determined, and the oxygen is automatically added. Moreover, before performing two-stage compression (the second compression) of the waste gas, hydrogen is automatically added. It is preferable to adjust an additive amount of the hydrogen so that the oxygen concentration in the waste gas measured by using an $O_2$ densitometer 9 at an outlet of the compressor falls below a set value based on a result of measuring a waste gas flow volume at the outlet of the dryer 11 with the waste gas flowmeter 12.

In this case, it is preferable to include no heat source in any unit other than the first-stage compression unit and the second-unit compression unit. Additionally, it is preferable to install an intercooler 5-3A immediately behind the first-stage catalytic unit, install an aftercooler 5-3B immediately behind the second-stage catalytic unit, and avoid installing a cooling device outside the second-stage compressor 5. According to such an argon gas recovering and purifying apparatus, the catalytic reaction can be realized with the minimum energy.

Further, the argon gas recovering and purifying apparatus 100 preferably has an automatic pressure adjuster 8 which constantly monitors an intake pressure or a discharge pressure with respect to a fluctuation in waste argon gas flow volume at an inlet of the second-stage compressor 5 to perform bypass control. Consequently, at the time of performing the catalytic reaction in each catalytic unit, the reaction is stabilized.

Furthermore, the dryer 11 is preferably a non-purge type dryer having a silica alumina base, activated alumina base, or synthetic zeolite base adsorbent. According to such a dryer, moisture can be stably removed while reducing loss of the waste gas as much as possible, and the moisture can be prevented from being adsorbed to the adsorbent (zeolite) at the time of adsorbing and removing the nitrogen or the carbon dioxide in an adsorption tower. Here, as a specific example of the silica alumina base adsorbent, there is dry Moon SK-400 (Shirakawa Seisakusho) or the like.

Moreover, the ordinary-temperature adsorption tower 13 is preferably a three-tower type ordinary-temperature adsorption tower. With such an adsorption tower, adsorption and removal can be more efficiently carried out. Since an impurity gas (the nitrogen, the carbon dioxide) has been adsorbed to the adsorbent in the adsorption tower after performing the adsorption and the removal, desorption (separation) of the impurity gas must be carried out to brace for a subsequent adsorbing operation. To promote the desorption of the impurity gas, it is preferable to reduce a pressure in the adsorption tower where desorption is performed to an atmospheric pressure or less by a vacuum pump 14.

Additionally, the argon gas recovering and purifying apparatus 100 also preferably has a recovered gas analyzer (QICA) 16 that measures concentrations of the nitrogen, the oxygen, and the carbon monoxide in the recovered gas. When such an apparatus is further provided, changes in concentration of the impurity gas in the recovered gas can be constantly measured.

Further, the argon gas recovering and purifying apparatus 100 preferably has a recovered gas return pipe through which a part or all of the recovered gas is returned to the waste argon gas storage tank 2 when a level in the waste argon gas storage tank 2 is lowered or a measurement value of the recovered gas analyzer 16 exceeds an allowable value. In this case, opening or closing a recovered gas reject valve 17 enables controlling the return. Furthermore, when the control is executed in this manner, the impurity gas can be prevented from flowing toward the silicon single crystal manufacturing apparatus side.

Furthermore, the argon gas recovering and purifying apparatus 100 further preferably has a purge valve 22 which purges a part or all of the recovered gas or the waste argon gas outdoors when concentrations of the nitrogen, the oxygen, and the carbon monoxide in the waste argon gas exceed predetermined allowable values or a measurement value of the recovered gas analyzer 16 exceeds an allowable value. When such an apparatus is further provided, the impurity gas can be prevented from flowing toward the downstream side.

Moreover, to store a starting material gas (the waste argon gas), it is preferable to provide a buffer tank 10 having a pressure analyzer 21 (PICA) as required. Additionally, to store the recovered gas, it is preferable to provide a recovered gas buffer tank 15 having a pressure analyzer 23. Further, it is also preferable to provide a flowmeter 24 configured to measure a flow volume of the recovered gas.

[Argon Gas Recovering and Purifying Method]

An argon gas recovering and purifying method according to the present invention is an argon gas recovering and purifying method including steps of: introducing a waste argon gas containing nitrogen, oxygen, and carbon monoxide from a silicon single crystal manufacturing apparatus into a waste argon gas storage tank; removing solid matters in a pretreatment facility which removes the solid matters in the waste argon gas; converting the oxygen into water and converting the carbon monoxide into carbon dioxide by a catalytic reaction; and removing the water, the carbon dioxide, and the nitrogen to obtain a recovered gas,
wherein the catalytic reaction is carried out with compression heat alone by arranging a catalyst in a two-stage compressor, and the water is removed by a dryer in advance and then the nitrogen and the carbon dioxide are adsorbed and removed in an ordinary-temperature adsorption tower at the step of obtaining the recovered gas.

According to such an argon gas recovering and purifying method, an impurity gas contained in a large air volume of the argon gas discharged from the silicon single crystal manufacturing apparatus can be stably removed by using a simple low-cost facility.

The argon gas recovering and purifying method according to the present invention will now be described hereinafter with reference to FIG. 1, but the present invention is not restricted thereto.

[Step of Introducing Waste Argon Gas]

Figure 1:
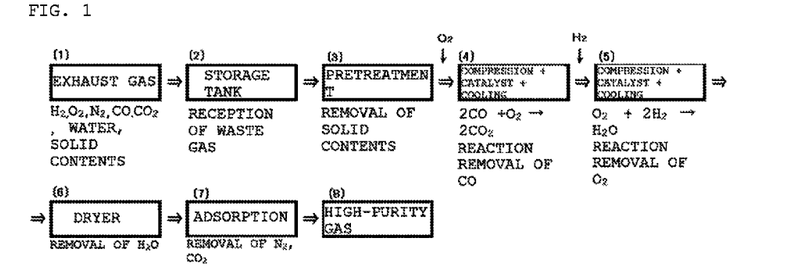
FIG. 1 is a flowchart showing an example of an argon gas recovering and purifying method according to the present invention.

FIG. 1 is a flowchart showing an example of the argon gas recovering and purifying method according to the present invention. As indicated by (1) and (2) in FIG. 1, a waste argon gas containing nitrogen, oxygen, carbon monoxide, and others is first introduced into the waste argon gas storage tank from the silicon single crystal manufacturing apparatus.

At this time, it is preferable to directly introduce the waste gas led from the silicon single crystal manufacturing apparatus into the waste argon gas storage tank without being compressed by a fluid carrying device such as a blower. That is, it is preferable to directly connect the silicon single crystal manufacturing apparatus with the waste argon gas storage tank through a waste argon gas pipe. That is because many silicon single crystal manufacturing apparatuses are connected when distances from the silicon single crystal manufacturing apparatuses to the waste gas receiving storage tank are long or when a large amount of waste gas is received, eliminating a position with a negative pressure in the pipes can thus prevent a large amount of air components (oxygen, nitrogen, and others) from being mixed into the waste gas even if unexpected leakage occurs in many connected manufacturing furnaces or at connecting positions of their waste gas ducts, and the operation can be stably performed.

Here, it is preferable to determine a plan of the waste gas pipes which can be operated within the range of an allowable back pressure of a vacuum pump associated with the silicon single crystal manufacturing apparatus and a working pressure of the waste argon gas storage tank. Consequently, a pressure in the waste gas pipes does not become a negative pressure anywhere, a constantly pressurized state is provided, and hence the air components can be prevented from entering with respect to small leak. It is to be noted that unexpected infiltration of air into the waste gas can be constantly monitored by installing the air component monitoring meter on a preceding side of the waste argon gas storage tank, and the waste gas can be purged to the air before the waste argon gas storage tank when the air components exceeding set concentrations are detected.

[Step of Removing Solid Matters]

Then, as indicated by (3) in FIG. 1, the waste argon gas is introduced into a pretreatment facility from the waste argon gas storage tank to remove solid matters. As the pretreatment facility, the above described facility can be used.

[Step of Conversion]

Subsequently, the oxygen is converted into water and the carbon monoxide is converted into the carbon dioxide by a catalytic reaction, respectively. In the present invention, the catalytic reaction is carried out by arranging a catalyst in the two-stage compressor and using only compression heat generated when the waste gas is compressed. In the present invention, the waste gas is subjected to two-stage compression by using the two-stage compressor because a pressure in an adsorption step which is the last step falling in the range of 0.3 to 1.1 MPa is preferable. It is preferable to perform the catalytic reaction as follows.

First, as indicated by (4) in FIG. 1, an amount of carbon monoxide is calculated by measuring concentration of the carbon monoxide in the waste gas in advance and also measuring a flow volume of the waste gas, oxygen controlled to a necessary stoichiometric amount or above is added to the waste gas, and a one-stage compressing operation is performed in the first-stage compression unit. A pressure of the waste gas in the first-stage compression unit is set to approximately an atmospheric pressure to 0.3 MPa or more by the one-stage compressing operation. At this time, the waste gas and the added oxygen are sufficiently agitated, and a waste gas temperature is increased to higher temperatures by the compression heat.

Then, a reaction of the carbon monoxide and the added oxygen in the waste gas heated by introducing the waste gas into the first-stage catalytic unit installed immediately behind the first-stage compression unit advances, and the carbon dioxide is produced ($2CO+O_2 \rightarrow CO_2$).

Subsequently, as indicated by (5) in FIG. 1, hydrogen comparable to an amount of excessive oxygen in the waste gas is added in advance, and a second-stage compressing operation is performed. A pressure of the waste gas in the second-stage compression unit is set to 0.3 to 1.1 MPa by the second-stage compressing operation. At this time, the waste gas and the added hydrogen are sufficiently agitated, and a temperature of the waste gas is increased to higher temperatures by the compression heat.

Then, a reaction of the oxygen and the added hydrogen in the waste gas heated by introducing the waste gas into the second-stage catalytic unit installed immediately behind the second-stage compression unit advances, and water is produced ($O_2+2H_2 \rightarrow 2H_2O$). The waste gas temperatures in both the first and second stages reach approximately 100 to 200° C. by the heat generated at the time of compression, and this temperature is a sufficiently high temperature for the oxygen, the hydrogen, and the carbon monoxide in the waste gas to react in the catalyst such as Pt (platinum) installed in the compressor. Consequently, such a heating device before the catalytic reaction as those disclosed in Patent Literatures 1 and 2 is no longer necessary, and the catalytic reaction can be realized with the minimum energy.

In this case, it is preferable to cool the waste argon gas by installing an intercooler immediately behind the first-stage catalytic unit and installing an aftercooler immediately behind the second-stage catalytic unit without providing a cooling device outside the two-stage compressor. In this case, since the heat generated by the compression is cooled to ordinary temperatures by the intercooler and the aftercooler provided in the compressor, installing the catalysts between the respective compression units and the respective coolers enables eliminating such a cooling device behind a catalytic cylinder as disclosed in Patent Literatures 1 and 2.

Further, at the time of introducing the waste argon gas into the two-stage compressor, it is preferable to allow a fixed amount of the waste argon gas to constantly flow through the two-stage compressor by constantly monitoring an intake pressure or a discharge pressure with respect to a fluctuation in a waste argon gas flow volume at the inlet of the two-stage compressor to perform bypass control. Such an argon gas recovering and purifying method enables stabilizing the reaction in each catalytic unit.

[Step of Obtaining Recovered Gas]

After the catalytic reaction, the water, the carbon dioxide, and the nitrogen remaining in the waste gas can be adsorbed at ordinary temperatures by using an adsorbent such as zeolite. However, among these substances, the water has a very strong affinity for the zeolite, and hence it can be easily adsorbed. On the other hand, since the water is hard to desorb from some types of zeolite and hard to regenerate, an adsorption capability of the zeolite may be lowered. Thus, as indicated by (6) in FIG. 1, among the water, the carbon dioxide, and the nitrogen remaining in the waste gas, the water alone is dehumidified to the utmost limit by a dryer in advance, e.g., a non-purge type dryer having an alumina base adsorbent. Consequently, moisture can be stably removed while reducing loss of the waste gas as much as possible, and it is possible to avoid adsorption of the moisture to the adsorbent (the zeolite) at the step of adsorbing the nitrogen or the carbon dioxide and a decrease in adsorption capability.

Further, the dryer adopts a two-tower switching heating regeneration system, and it preferably performs adsorption on one side and regeneration in the other tower. Consequently, heating or cooling a purge gas produced at the time of regeneration enables mixing substances other than moisture in a regenerated gas with the dehumidified gas and introducing them to a subsequent step without discarding them to the outside of the system. Furthermore, it is preferable to dehumidify the moisture in the waste gas until a dew-point temperature reaches −70° C. or below.

The nitrogen and the carbon dioxide remain in the waste gas which has passed through the dryer. Subsequently, as indicated by (7) in FIG. 1, the nitrogen and the carbon dioxide remaining in the waste gas are adsorbed and removed with the use of an adsorbent, e.g., the zeolite filling the ordinary-temperature adsorption tower. Consequently, a low-temperature adsorption tower using a high-pressure gas manufacturing facility, a freezer device such as a cold box disclosed in Patent Literatures 1 to 3 is not necessary, and the impurity gas contained in a large air volume of the argon gas discharged from the silicon single crystal manufacturing apparatus can be stably removed by using a simple low-cost facility.

At this time, when the concentrations of the nitrogen, the oxygen, and the carbon monoxide in the waste argon gas exceed predetermined allowable values at the inlet of the ordinary-temperature adsorption tower, it is preferable to immediately stop supply of the waste argon gas to the ordinary-temperature adsorption tower and purge a part or all of the waste argon gas to the outside or return the same to the waste argon gas storage tank.

Here, as the ordinary-temperature adsorption tower, a multi-tower type ordinary-temperature adsorption tower like a three-tower type ordinary-temperature adsorption tower can be preferably used. Although the adsorption tower employing two towers, three towers, or more towers can be operated, in case of the three-tower type, alternating switching and repeating (1) adsorption, (2) desorption, and (3) pressure raising in each tower enables continuously adsorbing and removing the nitrogen and the carbon dioxide in the waste gas. The pressure at the time of adsorption is preferably 0.3 MPa or more and 1.1 MPa or less. Moreover, as the temperature at the time of adsorption, ordinary temperatures are desirable, but cooling can be performed as required.

The adsorption tower can be operated based on a PSA (Pressure Swing Adsorption) system. Additionally, at the time of desorption, exhaust ventilation is performed until an atmospheric pressure is achieved, and then the pressure is reduced to the atmospheric pressure or less by the vacuum pump, thereby promoting the desorption of the impurity gas (the nitrogen, the carbon dioxide) adsorbed to the adsorbent. After the desorption, at the time of increasing the pressure, a part of the gas which has passed through the adsorption tower to have high purity is introduced to raise the pressure, and pressure restoration is performed until a predetermined pressure is achieved to brace for the next adsorption operation. When this series of operations is repeatedly performed by automatic control, the impurity gas in the waste gas can be removed.

In this case, at the time of raising the pressure in any adsorption tower in the three-tower type ordinary-temperature adsorption tower, it is preferable to control an amount of the recovered gas used for raising the pressure in accordance with an inflow amount of the waste argon gas which flows into the adsorption tower by measuring this inflow amount. Consequently, a fluctuation in pressure in the adsorption tower can be absorbed, and the adsorbing operation can be stably carried out.

Additionally, it is preferable to automatically change times of the adsorption, the desorption, and the pressure raising in accordance with a fluctuation in flow volume of the waste argon gas. Consequently, the adsorption, the desorption, and the pressure raising can be more efficiently performed.

When the water and the impurity gas are removed in this manner, as indicated by (8) in FIG. 1, a high-purity gas (the recovered gas) can be obtained. It is preferable to allow the high-purity gas (the recovered gas) having passed through the adsorption tower to pass through a filter while being subjected to pressure control so that fine particles are removed, and then supply this gas to the silicon single crystal manufacturing apparatus.

At this time, for example, when the impurity gas concentration (the concentrations of the nitrogen, the oxygen, and the carbon monoxide) in the recovered gas exceeds a fixed value (an allowable value), it is preferable to immediately return a part or all of the recovered gas to the waste argon gas storage tank or purge the same to the air (outdoor).

Further, when an amount of the waste gas from the silicon single crystal manufacturing apparatus is insufficient, a waste argon gas storage tank level is lowered to a fixed level. At this time, when the supply of the recovered gas to the single crystal manufacturing apparatus is stopped and this gas is returned to the waste argon gas storage tank, the operation can be stably carried out without deactivating the facility.

Further, even in such a situation, a purchase argon gas is automatically supplied from a CE (cold evaporator) tank through an evaporator in place of the recovered gas, and the supply of the argon gas is maintained without a fluctuation in pressure with respect to the single crystal manufacturing apparatus. That is because, a supply pipe of the received argon gas is connected to the purchase argon gas supplied from the CE tank, a pressure of the recovered argon gas is usually slighter higher, and hence the recovered argon gas is used on a priority base. Thus, when the pressure of the recovered gas side is lowered due to stop of the supply for the reason, the purchase argon gas is automatically supplied from the CE tank side.

EXAMPLES

Although the present invention will be more specifically described based on an example, the present invention is not restricted thereto.

Example

First, the apparatus according to the present invention shown in FIG. 2 was used, and a waste gas was put into a waste argon gas storage tank from a silicon single crystal manufacturing apparatus. An operation was performed with a pressure of a waste gas receiving system set to 2.0 kPaG (a positive pressure). Consequently, infiltration of air components into the waste gas was successfully suppressed to the minimum level, an operation was performed without obstructing performance of a vacuum pump of the silicon single crystal manufacturing apparatus or a waste argon gas storage tank. A receiving amount is resigned to the situation. The waste gas was introduced into a two-stage compressor after removing solid contents by a pretreatment facility.

Then, CO concentration in the waste gas was measured on a preceding stage of the two-stage compressor, an amount of the waste gas which passes through a compressor was measured and calculated, and an amount of oxygen to be added to the waste gas was determined. An additive amount of oxygen was usually 20 Nl/min or less.

The waste gas passed through a catalytic unit after increasing its pressure to 0.3 MPa or more from a value close to the atmospheric pressure by a first-stage compression unit, and a waste gas temperature after compression was approximately 170 to 190° C. The waste gas having passed through the catalytic unit was introduced into an intercooler and cooled.

Subsequently, hydrogen was added before introduction to a second-stage compression unit. Although an additive amount was usually 20 Nl/min or less, it was controlled to a lower detection limit or less by an oximeter installed at an outlet of the two-stage compressor. After addition of the hydrogen, the waste gas was introduced into the second-stage compression unit, and compressed to 0.3 to 1.1 MPa. A temperature after compression was 170 to 190° C., and the waste gas immediately passed through the catalytic unit and was cooled in an aftercooler.

The gas having passed through the two-stage compressor was introduced into a non-purge type dryer to reduce moisture in the waste gas as much as possible, and dehumidification was performed until a dew-point temperature reached −70° C. or less. At this time, the dryer was operated without discharging the waste gas to the outside of the system except a drain.

Almost all the solid matters, the moisture, the oxygen, the carbon monoxide, and the hydrogen were removed from the waste gas having passed through the non-purge type dryer.

For the purpose of removing the nitrogen and the carbon dioxide remaining in the waste gas, the waste gas was introduced into the three-tower type ordinary temperature adsorption tower. A working pressure was 0.3 to 1.1 MPa at the time of adsorption, and exhaust ventilation was carried out in the tower until reaching the atmospheric pressure and then the pressure was reduced by a vacuum pump at the time of desorption. After end of the desorption, to raise the pressure in the tower, part of the gas having high purity after having passed through the adsorption tower (a recovered gas) was used, thereby raising the pressure. The pressure was raised up to 1.1 MPa from a pressure reduced state, and the processing advanced to the subsequent adsorbing operation upon completion of the pressure raising. Automatic valves were provided at an inlet and an outlet of each tower to automatically repeat the operation, and the automatic operation was continuously carried out, thus stably obtaining the recovered gas.

When the impurity gas concentration in the recovered gas was increased or a waste argon gas storage tank level was lowered, continuous operations of the facility were stabilized by returning the recovered gas to the waste argon gas storage tank or purging the recovered gas to the air.

Table 1 shows treatment step flows, treatment conditions, and results of the recovered gas impurity concentration in Example and described in Patent Literatures 1 to 3.

TABLE 1

| | Example | Patent Literature 1 | Patent Literature 2 | Patent Literature 3 |
|---|---|---|---|---|
| Treatment step flow (from inlet toward outlet along direction of ↓) | Silicon single crystal manufacturing apparatus ↓ Waste argon gas storage tank ↓ Silicon oxide (solid content) pretreatment facility ↓ Two-stage compressor (Addition of $O_2$→first-stage compression unit→catalytic unit→intercooler→addition of $H_2$→second-stage compression unit→catalytic unit→after cooler) (100 to 200° C., $2CO + O_2 \rightarrow 2CO_2$, $O_2 + 2H_2 \rightarrow 2H_2O$) ↓ Dryer($H_2O$) ↓ Multi-tower type ordinary-temperature adsorption tower ($CO_2$, $N_2$) ↓ Silicon single crystal manufacturing apparatus | Single crystal manufacturing furnace ↓ Blower ↓ Gas holder ↓ Dust collector ↓ Compressor ↓ Oil removal cylinder, Oil filter ↓ Heater (100 to 300° C.) ↓ Catalytic cylinder (addition of $H_2$, $H_2 + O_2 \rightarrow H_2O$) ↓ Cooling device ↓ Ordinary-temperature adsorption tower ($H_2O$, $CO_2$) ↓ Cold box (adsorption tower ($O_2$, $N_2$)) ↓ Single crystal manufacturing furnace | Single crystal manufacturing furnace ↓ Blower ↓ Gas holder ↓ Dust collector ↓ Compressor ↓ Oil removal cylinder + oil filter ↓ Preheater + heater (100 to 350° C.) ↓ Catalytic cylinder (addition of $H_2$, $H_2 + O_2 \rightarrow H_2O$) ↓ Cooling device ↓ Ordinary-temperature adsorption tower ($H_2O$, $CO_2$) ↓ Cold box (adsorption tower ($O_2$, $N_2$)) ↓ Single crystal manufacturing furnace | Single crystal manufacturing furnace ↓ Gas holder ↓ Dust remover ↓ Compressor ↓ Oil removal cylinder ↓ Heater ↓ Catalytic reactor (addition of $O_2$ or air) ($H_2 + O_2 \rightarrow H_2O$, $CO + O_2 \rightarrow CO_2$) ↓ Cooling device ↓ Ordinary-temperature adsorption tower ($H_2O$, $CO_2$) ↓ Low-temperature adsorption tower ($N_2$, CO) ↓ Single crystal manufacturing furnace |
| Treated air volume | — | 100 Nm³/min 88 Nm³/Hr (recovered gas amount) | No description 295 Nm³/Hr (recovered gas amount) | No description |
| Waste gas carrier device | Absence | Presence | Presence | Absence |
| Catalytic reaction temperature | 100 to 200° C. | 100 to 300° C. | 100 to 350° C. | 200 to 350° C. |
| Adsorption tower operating pressure | 0.3 to 1.0 MPa (adsorption) Pressure reduction (desorption) | 500 to 528 kPa (adsorption) | 0.65 MPa (compression) | No description |
| Low-temperature impurity gas removing step | Absence | Rectification tower: no description of temperatures | Rectification tower: no description of temperatures | Second: −10 to −50° C. |
| Recovery rate | — | No description | No description | No description |
| Recovered gas impurity concentration (ppm) | | | | |
| $H_2$ | ≤5 | ≤1.0 | No description | ≤0.5 |
| $O_2$ | ≤0.5 | ≤1.0 | No description | ≤0.2 |
| $N_2$ | ≤5 | ≤1.0 | No description | ≤0.1 |
| CO | ≤0.5 | ≤1.0 | No description | ≤1.0 |
| $CO_2$ | ≤0.5 | ≤1.0 | No description | ≤1.0 |
| Moisture (dew point) | ≤−70 (° C.) | No description | No description | ≤−75 |

As shown in Table 1, in Example, as the impurity gas concentration in the recovered gas, $H_2 \leq 5$ ppm, $O_2 \leq 0.5$ ppm, $N_2 \leq 5$ ppm, CO, $CO_2 \leq 0.5$ ppm, and moisture (a dew point temperature) $\leq -70°$ C. were observed.

Further, as shown in Table 1, in the present invention, a low-temperature adsorption tower using a high-pressure gas manufacturing facility or a freezer device, etc., such as a cold box as described in Patent Literatures 1 to 3 is not necessary, and it has been revealed that using the simple low-cost facility enables stably removing the impurity gas contained in the large air volume of the argon gas discharged from the silicon single crystal manufacturing apparatus.

It is to be noted that the present invention is not restricted to the foregoing embodiment. The foregoing embodiment is just an illustrative example, and any example which has substantially the same configuration and exerts the same functions and effects as the technical concept described in claims of the present invention is included in the technical scope of the present invention.

The invention claimed is:

1. An argon gas recovering and purifying method comprising:
   introducing a waste argon gas containing nitrogen, oxygen, and carbon monoxide from a silicon single crystal manufacturing apparatus into a waste argon gas storage tank;
   removing solid matters in a pretreatment facility which removes the solid matters in the waste argon gas;
   converting the oxygen into water and converting the carbon monoxide into carbon dioxide by a catalytic reaction; and
   removing the water, the carbon dioxide, and the nitrogen to obtain a recovered gas,
   wherein the catalytic reaction is carried out with compression heat alone by arranging a catalyst in a two-stage compressor, then the water is removed by a dryer and then the nitrogen and the carbon dioxide are adsorbed and removed in an ordinary-temperature adsorption tower at the step of obtaining the recovered gas,
   in the converting, auxiliary oxygen is added to the waste argon gas while controlling an additive amount before a first-stage compression unit in the two-stage compressor, then one-stage compressing operation is performed, a temperature of the waste argon gas is increased to 100 to 200° C. by compression heat generated by the compressing operation, and then the carbon monoxide and the auxiliary oxygen are immediately subjected to the catalytic reaction in a first-stage catalytic unit installed behind the first-stage compression unit to convert them into the carbon dioxide,
   the waste argon gas is cooled, and
   hydrogen is then added to the waste argon gas while controlling an additive amount before a second-stage compression unit in the two-stage compressor to perform second-stage compressing operation, a temperature of the waste argon gas is increased to 100 to 200° C. by compression heat generated by the compressing operation, and then the oxygen and the added hydrogen are immediately subjected to the catalytic reaction in a second-stage catalytic unit installed behind the second-stage compression unit to convert them into the water.

2. The argon gas recovering and purifying method according to claim 1, wherein the silicon single crystal manufacturing apparatus is directly connected to the waste argon gas storage tank through a waste argon gas pipe without installing a fluid carrying device so that a positive pressure is constantly maintained in order to prevent any portion in the waste argon gas pipe from having a negative pressure.

3. The argon gas recovering and purifying method according to claim 1, wherein a heat source is not used in any unit other than the first-stage compression unit and the second-stage compression unit.

4. The argon gas recovering and purifying method according to claim 1, wherein an intercooler is installed immediately after the first-stage catalytic unit and an aftercooler is installed immediately after the second-stage catalytic unit to cool the waste argon gas without providing a cooling device outside the two-stage compressor.

5. The argon gas recovering and purifying method according to claim 1, wherein, at the time of introducing the waste argon gas into the two-stage compressor, a fixed amount of the waste argon gas is allowed to constantly flow through the two-stage compressor by constantly monitoring an intake pressure or a discharge pressure to a fluctuation in a flow volume of the waste argon gas at an inlet of the two-stage compressor to perform circulation control.

6. The argon gas recovering and purifying method according to claim 1, wherein the dryer is a non-purge type dryer having a silica alumina base, activated alumina base, or synthetic zeolite base adsorbent.

7. The argon gas recovering and purifying method according to claim 1, wherein the ordinary-temperature adsorption tower is a multi-tower type ordinary-temperature adsorption tower.

8. The argon gas recovering and purifying method according to claim 7, wherein the multi-tower type ordinary-temperature adsorption tower is a three-tower type ordinary-temperature adsorption tower, and adsorption and removal of the nitrogen and the carbon dioxide in the waste argon gas, desorption of the adsorbed nitrogen and carbon dioxide, and pressure raising in the adsorption tower are alternately switched and repeated in the respective adsorption towers.

9. The argon gas recovering and purifying method according to claim 8, wherein, at the time of performing the pressure raising in any adsorption tower in the three-tower type ordinary-temperature adsorption tower, an amount of the recovered gas used for the pressure raising is controlled in accordance with an inflow amount of the waste argon gas which flows into the adsorption tower by measuring the inflow amount.

10. The argon gas recovering and purifying method according to claim 8, wherein times of the adsorption, the desorption, and the pressure raising are automatically changed in accordance with a fluctuation in a flow volume of the waste argon gas.

11. The argon gas recovering and purifying method according to claim 1, wherein, when a level of the waste argon gas storage tank is lowered with a fluctuation in flow volume of the waste argon gas, a full amount of the recovered gas is automatically returned to the waste argon gas storage tank.

12. The argon gas recovering and purifying method according to claim 1, wherein, when concentrations of the nitrogen, the oxygen, and the carbon monoxide in the recovered gas exceed predetermined allowable values, supply of the recovered gas to the silicon single crystal manufacturing apparatus is immediately stopped, and a part or all of the recovered gas is purged outdoors or returned to the waste argon gas storage tank.

13. The argon gas recovering and purifying method according to claim 1, wherein, when concentrations of the nitrogen, the oxygen, or the carbon monoxide in the waste argon gas exceed predetermined allowable values at an inlet of the ordinary-temperature adsorption tower, supply of the waste argon gas to the ordinary-temperature adsorption tower is immediately stopped, and a part or all of the waste argon gas is purged outdoors or returned to the waste argon gas storage tank.

14. An argon gas recovering and purifying apparatus comprising:
- a waste argon gas storage tank which receives a waste argon gas containing nitrogen, oxygen, and carbon monoxide from a silicon single crystal manufacturing apparatus;
- a pretreatment facility which removes solid matters in the waste argon gas;
- a two-stage compressor which has a catalyst arranged therein, the catalyst enabling a catalytic reaction of converting the oxygen into water and converting the carbon monoxide into carbon dioxide with the use of only compression heat generated by compressing the waste argon gas, the two-stage compressor comprising:
  - an oxygen flow volume adjuster which adds oxygen to the waste argon gas while controlling an additive amount;
  - a first-stage compression unit which performs first compression;
  - a first-stage catalytic unit which has a catalyst arranged therein and performs a catalytic reaction of converting the carbon monoxide into carbon dioxide with the use of only compression heat generated by the first compression;
  - a hydrogen flow volume adjuster which adds hydrogen to the waste argon gas while controlling an additive amount;
  - a second-stage compression unit which performs second compression; and
  - a second-stage catalytic unit which has a catalyst arranged therein and performs a catalytic reaction of converting the oxygen into water with the use of only compression heat generated by the second compression;
- a dryer comprising an adsorbent which enables removal of the water; and
- an ordinary-temperature adsorption tower comprising an adsorbent which enables removal of the carbon dioxide and the nitrogen.

15. The argon gas recovering and purifying apparatus according to claim 14, wherein the waste argon gas storage tank is directly connected to a silicon single crystal manufacturing apparatus through a waste argon gas pipe without installing a fluid carrying device.

16. The argon gas recovering and purifying apparatus according to claim 14, wherein a heat source is not included in any unit other than the first-stage compression unit and the second-stage compression unit.

17. The argon gas recovering and purifying apparatus according to claim 14, wherein an intercooler is installed immediately after the first-stage catalytic unit, an aftercooler is installed immediately after the second-stage catalytic unit, and a cooling device is not installed outside the two-stage compressor.

18. The argon gas recovering and purifying apparatus according to claim 14, wherein the argon gas recovering and purifying apparatus further comprises an automatic pressure adjuster which constantly monitors an intake pressure or a discharge pressure to a fluctuation in a flow volume of the waste argon gas at an inlet of the two-stage compressor to perform circulation control.

19. The argon gas recovering and purifying apparatus according to claim 14, wherein the dryer is a non-purge type dryer having a silica alumina base, activated alumina base, or synthetic zeolite base adsorbent.

20. The argon gas recovering and purifying apparatus according to claim 14, wherein the ordinary-temperature adsorption tower is a three-tower type ordinary-temperature adsorption tower.

21. The argon gas recovering and purifying apparatus according to claim 14, wherein the argon gas recovering and purifying apparatus further comprises a recovered gas analyzer which measures concentrations of the nitrogen, the oxygen, and the carbon monoxide in the recovered gas.

22. The argon gas recovering and purifying apparatus according to claim 21, wherein the argon gas recovering and purifying apparatus further comprises a recovered gas returning pipe which returns a part or all of the recovered gas to the waste argon gas storage tank when a level of the waste argon gas storage tank is lowered or a measurement value of the recovered gas analyzer exceeds an allowable value.

23. The argon gas recovering and purifying apparatus according to claim 21, wherein the argon gas recovering and purifying apparatus further comprises a purge valve which purges a part or all of the recovered gas or the waste argon gas outdoors when concentrations of the nitrogen, the oxygen, and the carbon monoxide in the waste argon gas exceed predetermined allowable values at an inlet of the ordinary-temperature adsorption tower or a measurement value of the recovered gas analyzer exceeds an allowable value.

* * * * *